US012629972B2

(12) United States Patent
Heitlinger

(10) Patent No.: US 12,629,972 B2
(45) Date of Patent: May 19, 2026

(54) BALL-TYPE COUPLING ARRANGEMENT FOR AN AGRICULTURAL TRACTOR

(71) Applicant: DEERE & COMPANY, Moline, IL (US)

(72) Inventor: Martin Heitlinger, Oestringen (DE)

(73) Assignee: DEERE & COMPANY, Moline, IL (US)

( * ) Notice: Subject to any disclaimer, the term of this patent is extended or adjusted under 35 U.S.C. 154(b) by 416 days.

(21) Appl. No.: 18/357,690

(22) Filed: Jul. 24, 2023

(65) Prior Publication Data

US 2024/0065128 A1    Feb. 29, 2024

(30) Foreign Application Priority Data

Aug. 23, 2022    (DE) .......................... 102022121264.5

(51) Int. Cl.
*B60D 1/06*        (2006.01)
(52) U.S. Cl.
CPC ...................................... *B60D 1/06* (2013.01)
(58) Field of Classification Search
CPC .................................. B60D 1/583; B60D 1/06
See application file for complete search history.

(56) References Cited

U.S. PATENT DOCUMENTS 4,291,893 A    9/1981    Hansen
5,725,229 A *  3/1998    McWethy ................ B60D 1/07
                                              280/491.5

6,932,375 B2      8/2005    Zahn
10,471,784 B1 * 11/2019    Herlihy .................... B60D 1/06
10,940,727 B2     3/2021    Billich
2024/0284816 A1 * 8/2024    Eckstein ............. A01B 59/042

FOREIGN PATENT DOCUMENTS

| | | | | |
|---|---|---|---|---|
| AT | 413025 B | * | 10/2005 | ............. B60D 1/583 |
| CA | 2266832 A1 | | 10/2000 | |
| DE | 3824028 C1 | | 2/1990 | |
| EP | 1616727 A1 | | 1/2006 | |
| EP | 1251016 B1 | | 6/2006 | |
| EP | 1433628 B1 | | 7/2008 | |
| EP | 2820933 B1 | | 5/2018 | |
| EP | 2820932 B1 | | 8/2018 | |
| GB | 2429195 A | * | 2/2007 | ............. B60D 1/06 |

OTHER PUBLICATIONS

European Search Report in application No. 23188244.0, dated Jan. 29, 2024, 14 pages.

* cited by examiner

*Primary Examiner* — Kevin Hurley

(57)        ABSTRACT

A ball-type coupling arrangement for an agricultural tractor including a coupling base with a coupling ball attached thereto for receiving a coupling socket, a coupling housing arranged on the coupling base, a hold-down device including a planar stop region formed on an outer contour, the hold-down device coupled to the coupling housing such that it is pivotable between a position locking the coupling ball and a position releasing the coupling ball, and a closure element attached to the coupling housing, the closure element contacting the planar stop region in a locking position to lock the hold-down device in its locking position.

14 Claims, 8 Drawing Sheets

BALL-TYPE COUPLING ARRANGEMENT FOR AN AGRICULTURAL TRACTOR

CROSS-REFERENCE TO RELATED APPLICATIONS

This application claims priority to German Patent Application No. 102022121264.5, filed Aug. 23, 2022, which is hereby incorporated by reference.

FIELD OF THE DISCLOSURE

The disclosure relates to a ball-type coupling arrangement for an agricultural tractor.

BACKGROUND

Agricultural tractors can include a variety of coupling devices used to connect to attachments or implements.

SUMMARY

Ball-type coupling arrangements of this type for use with agricultural tractors are known in a wide variety of embodiments, the latter frequently comprising a hold-down device which is in the form of an L-shaped steel forged part and which is mounted rotatably in the region of a first end between two opposite cheeks on the coupling housing and, in the region of a second end, has a thrust piece which faces the coupling ball and by means of which the movement clearance of a coupling socket placed onto the coupling ball can be restricted by bringing the hold-down device into a locking position to an extent such that an unintentional release of the coupling connection by the coupling socket springing from the coupling ball is prevented. The coupling socket in this connection is typically part of a drawbar of a working implement to be towed by the agricultural tractor, for example a loading trailer or the like.

To secure the coupling connection, a locking opening is formed in the hold-down device transversely with respect to the pivoting direction thereof, the locking opening being aligned with corresponding locking openings in the two cheeks of the coupling housing as soon as the hold-down device is in its position locking the coupling ball. A securing bolt can be pushed through the locking openings such that the hold-down device can be secured in this position.

After release of a securing element, the securing bolt, which is provided with a handle for better handling, can either be completely removable or else integrated in an actuating mechanism attached fixedly to the coupling housing. According to a design used by John Deere 6R tractors, the actuating mechanism includes a sleeve which projects on one of the cheeks of the coupling housing and in which the securing bolt is guided by means of a handle displaceably along a locking slotted guide formed in a sleeve wall, wherein the handle has a spring-pretensioned gripping piece which latches by means of an end-side end piece in a recess provided along the locking slotted guide when the securing bolt takes up a final position within the locking openings provided on the cheeks and on the hold-down device.

The previously described arrangements permit secure locking of the hold-down device, but it has turned out in practice that they are comparatively prone to wear because of their design, and therefore the handling of the securing bolt may be noticeably more difficult for an operator specifically in adverse environmental conditions.

In view thereof, it is an object of the present disclosure to specify a ball-type coupling arrangement of the type mentioned at the beginning with an arrangement, which is insensitive to soiling, for locking the hold-down device in its position locking the coupling ball.

This object is achieved by ball-type coupling arrangement for an agricultural tractor having the features of one or more of the embodiments herein.

The ball-type coupling arrangement for an agricultural tractor comprises a coupling base with a coupling ball, which is attached thereto, for receiving a coupling socket, which is complementary thereto, and with a coupling housing arranged on the coupling base, wherein a hold-down device is coupled to the coupling housing in such a manner that it is pivotable between a position locking the coupling ball and a position releasing the latter. In this case, a closure element is attached to the coupling housing, which closure element, in order to lock the hold-down device in its locking position, can be brought into contact with a planar stop region formed on an outer contour of the hold-down device. In the locking position formed in such a way, a pivoting movement of the hold-down device in the direction of the position releasing the coupling ball is completely blocked by the closure element.

Owing to its planar design, the stop region provided along the outer contour of the hold-down device has a comparatively low tendency to the adhesion of dirt. This can also be easily cleaned from the outside by hand or using a brush or a high-pressure cleaner, and therefore an unrestricted operation of the closure element can always be ensured.

The coupling housing can be an integral part of the coupling base. Alternatively, it is possible, however, for the coupling housing to be designed as a separate component and to be fastened releasably to the coupling base by means of a plurality of screws. The coupling base generally comprises a carrier plate, on the upper side of which the coupling housing is located. Left and right runners extend on the carrier plate and can be pushed into guide rails, corresponding to them, of a universal coupling interface in the rear region of the agricultural tractor and locked therein.

Advantageous developments of the ball-type coupling arrangement according to the disclosure can be found in one or more embodiments herein.

The closure element can be a transverse latch extending in the locking position perpendicular to the pivoting direction of the hold-down device on the coupling housing. The transverse latch can be produced from flat material or sheet material of a suitable steel alloy, and therefore it forms a flat mating surface for contact of the planar stop region provided on the hold-down device. In this case, force is introduced into the transverse latch by the hold-down device exclusively in the pivoting direction, and therefore no (undefined) transverse forces are exerted on the coupling housing. This decisively simplifies the structural design thereof.

Furthermore, it is possible that the transverse latch is coupled to the coupling housing in such a manner that it can be pivoted manually into a position releasing the locking of the hold-down device. If the ball-type coupling arrangement, as described at the beginning, comprises a hold-down device which is in the form of an L-shaped steel forged part and which is mounted rotatably in the region of a first end between two opposite cheeks on the coupling housing and, in the region of a second end, has a thrust piece which faces the coupling ball, the transverse latch can extend from the one to the other cheek of the coupling housing. In this case, a slot-shaped recess on one of the two cheeks can receive a coupling region of the transverse latch in a form-fitting manner, the coupling region being mounted rotatably within the slot-shaped recess by means of a hinge pin. The two cheeks can also be connected to each other on a side facing away from the transverse latch via a bridge portion, it being possible for a guide surface supporting the transverse latch to be additionally formed on the bridge portion. By this means, not only is the transverse latch relieved of load in respect of the forces acting on the part of the hold-down device, but the forces can also be introduced particularly uniformly into the coupling housing via the supporting guide surface.

In addition, the planar stop surface can be oriented radially with respect to a point of rotation serving for coupling the hold-down device to the coupling housing. Analogously, in this case the surface formed by the stop region is aligned with an imaginary radial extension passing through the point of rotation. This enables the transverse latch to be opened by being pivoted out of its locking position basically even if it is under load from the hold-down device.

For the purpose of comfortable operation of the transverse latch manually, provision can be made that the transverse latch has a gripping region at a free end opposite the coupling region. The gripping region can be shaped in the form of a latch portion projecting over the adjacent cheek of the coupling housing. In addition, it is conceivable that an anvil-like protrusion extending over the coupling region in the opposite direction to the free end and being in the form of a further latch portion is provided on the transverse latch. By action by means of a hammer or another impact tool on the anvil-like protrusion, opening of the transverse latch by it being pivoted out of its locking position can be assisted.

In order to prevent unintentional release of the coupling connection, the transverse latch can be secured in its locking position by means of a manually actuable securing mechanism.

There is the possibility here that the securing mechanism comprises a spring-pretensioned securing bolt, the free end of which engages in a recess formed in the transverse latch in the locking position thereof. The recess can extend on the end side in the region of the free end of the pivotable transverse latch and, for example, is in the form of an engagement slot adapted to the outside diameter of the securing bolt. In this case, the securing bolt, together with a compression spring provided for building up the spring pretensioning, can be mounted in a cheek of the coupling housing adjacent to the free end of the transverse latch, wherein a fastening end of the securing bolt can extend through the cheek and can support a knob which serves for the manual actuation and at the same time forms a mating bearing for limiting an extension movement of the spring-pretensioned securing bolt.

In this case, the recess can be contoured along an entry region in such a manner that a snap-action closure is formed in interaction with the free end of the spring-pretensioned securing bolt. The entry region can have a ramp-shaped contour which pushes the securing bolt away counter to the spring pretensioning during the closing of the pivotable transverse latch in the direction of its locking position, in order, when a final position is reached, to latch into the engagement slot adjoining it.

The engagement slot which is provided on the transverse latch, the coupling region, the two latch portions and the ramp-shaped contour can be produced in one working step by laser cutting when flat material or sheet material of a suitable steel alloy is used.

Furthermore, it is possible for the hold-down device to be pretensioned by means of a spring element in the direction of the position releasing the coupling ball. The spring element can be a leg spring which is supported at one end on the coupling housing and at the other end on an articulated shaft connected to the hold-down device for rotation therewith. The articulated shaft at the same time forms the rotatable mounting of the hold-down device on the coupling housing. The spring pretensioning exerted on the articulated shaft by means of the leg spring is dimensioned in such a manner that, when the locking is released, the hold-down device can automatically take up its position releasing the coupling ball.

The above and other features will become apparent from the following detailed description and accompanying drawings.

BRIEF DESCRIPTION OF THE DRAWINGS

The ball-type coupling arrangement according to the disclosure for an agricultural tractor will be described in more detail below with reference to the drawings. Here, identical reference signs relate to corresponding components or components which are of comparable function. In the drawings.

DETAILED DESCRIPTION

The embodiments or implementations disclosed in the above drawings and the following detailed description are not intended to be exhaustive or to limit the present disclosure to these embodiments or implementations.

Figure 1:
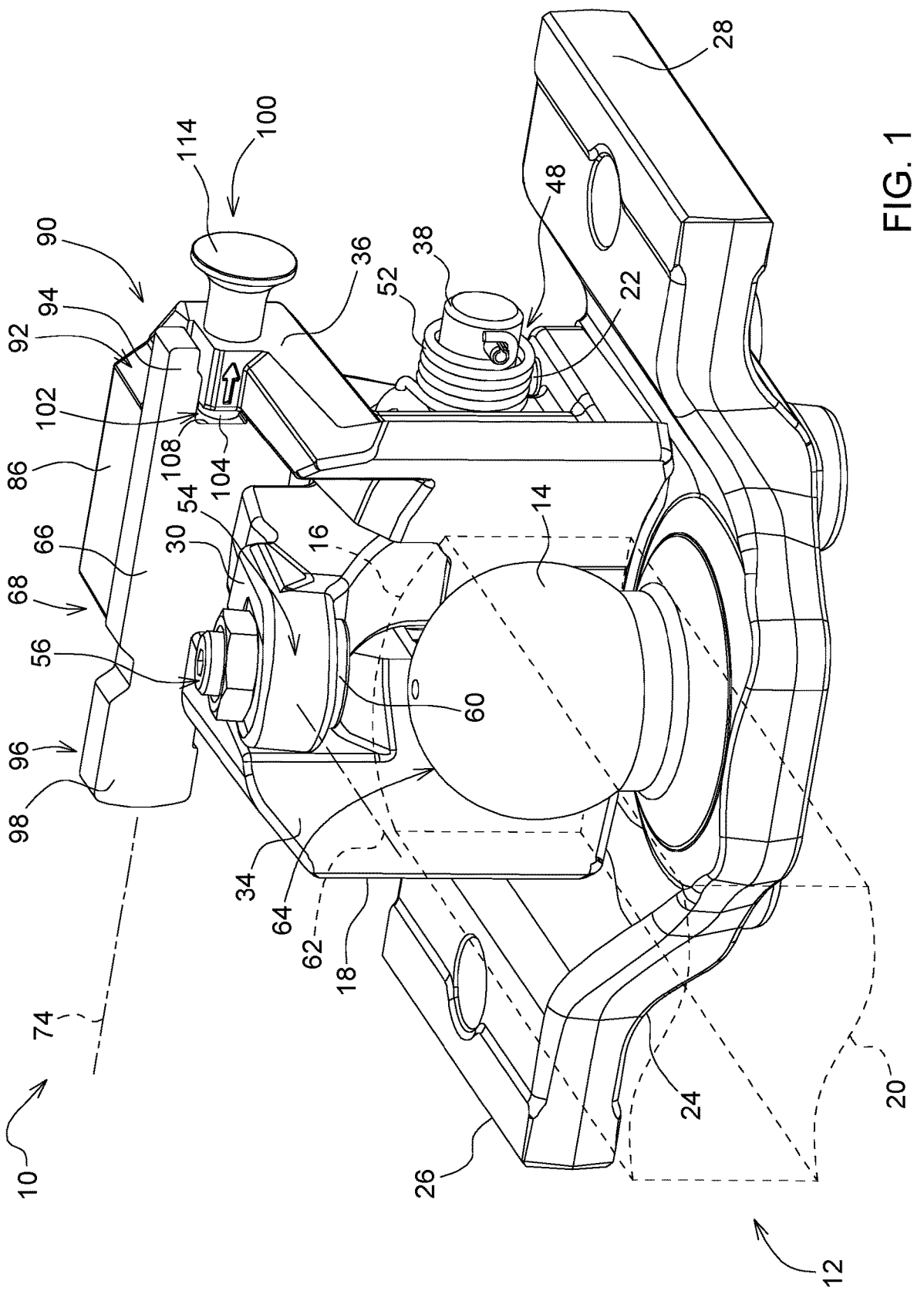
FIG. 1 shows a perspectively illustrated example embodiment of the ball-type coupling arrangement according to the disclosure in a locked state.
Figure 2:
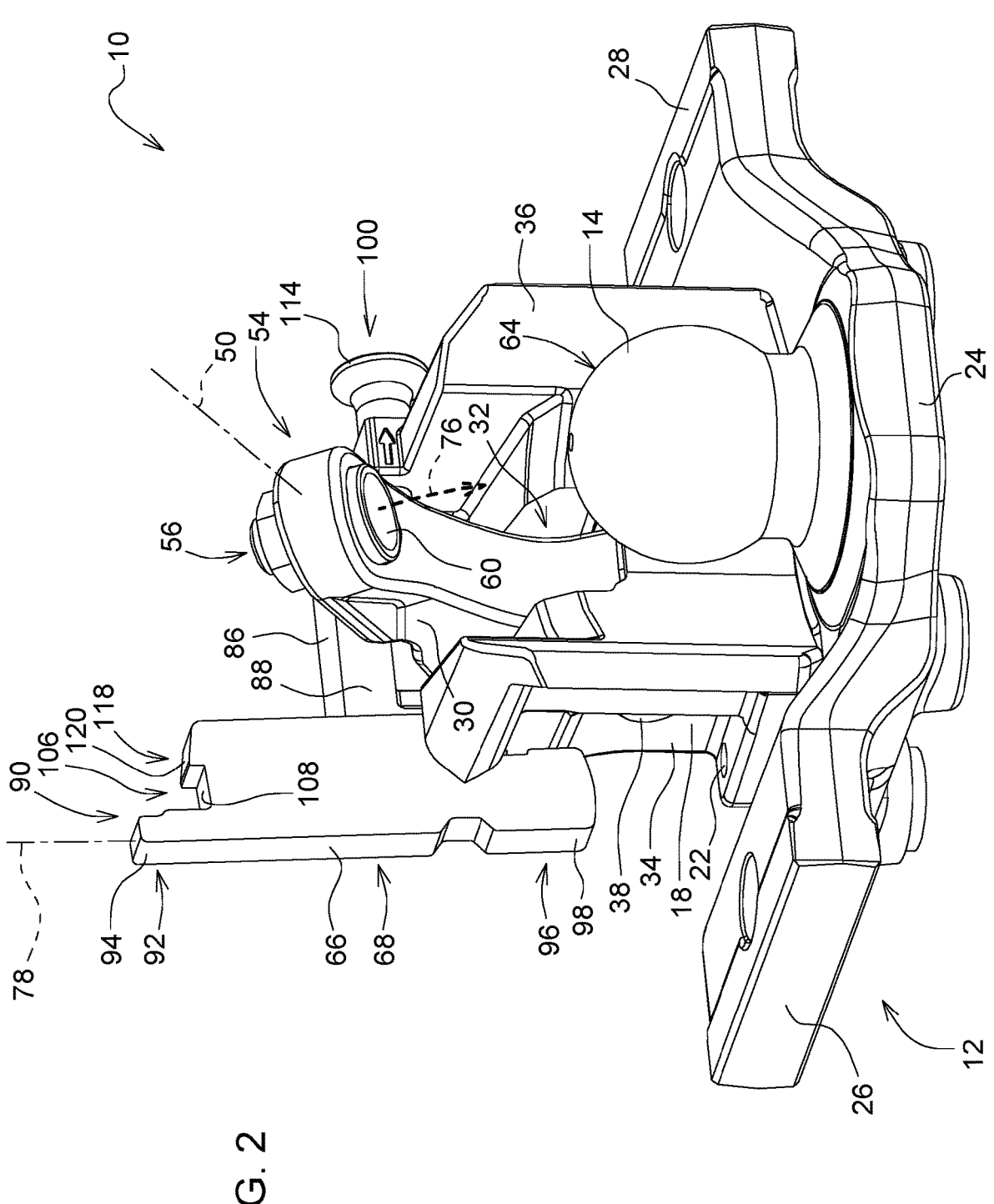
FIG. 2 shows the example embodiment reproduced in FIG. 1 of the ball-type coupling arrangement according to the disclosure in a released state.

FIGS. 1 and 2 reproduce an example embodiment, illustrated in different perspectives, of the ball-type coupling arrangement according to the disclosure for an agricultural tractor (not shown).

The ball-type coupling arrangement 10 comprises a coupling base 12 with a coupling ball 14, which is attached thereto, for receiving a coupling socket 16, which is complementary thereto, and with a coupling housing 18 arranged on the coupling base 12. The coupling socket 16 is merely indicated by dashed lines and is typically part of a drawbar 20 of a working implement to be towed by the agricultural tractor, for example a loading trailer or the like.

Figure 3:
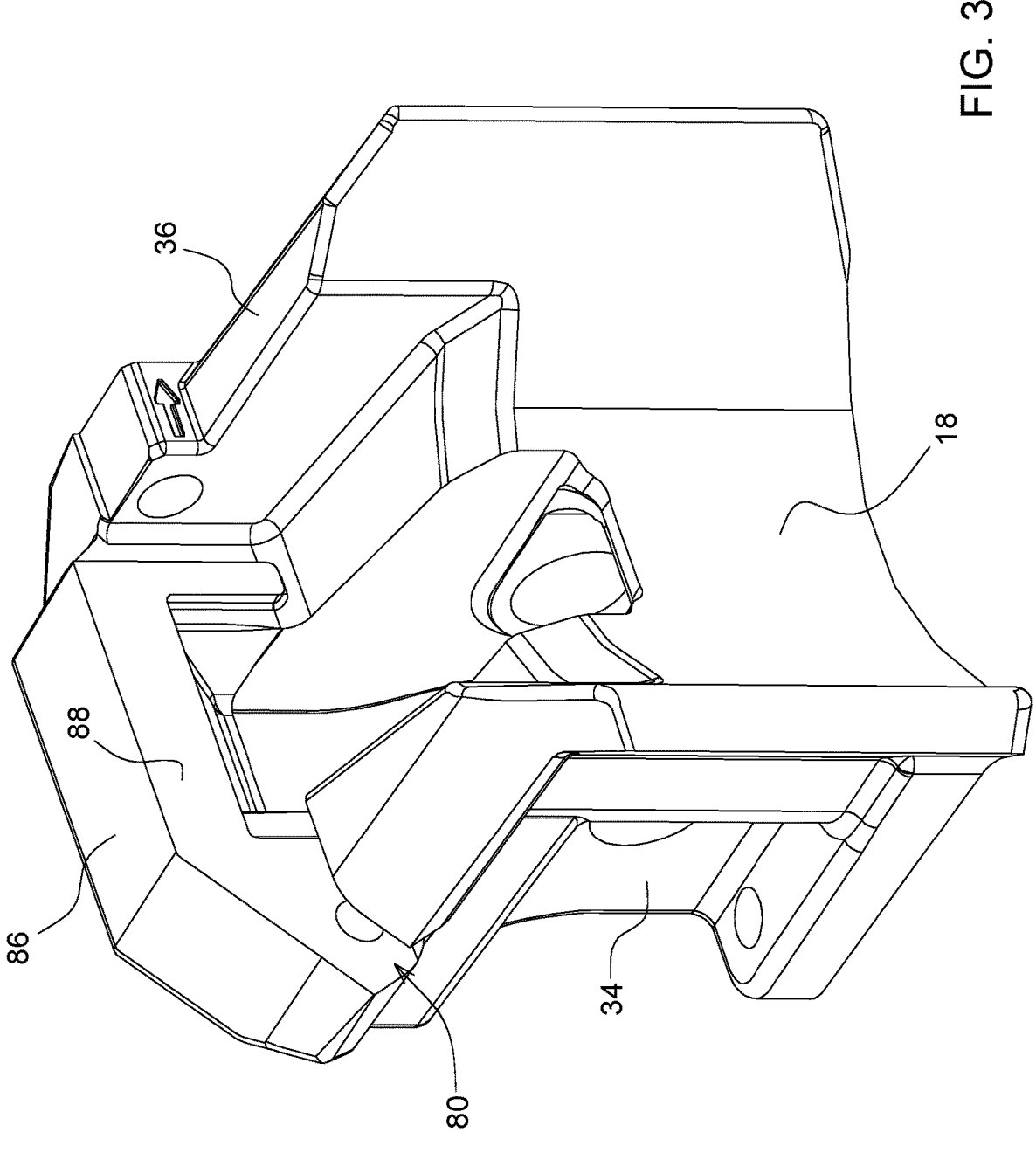
FIG. 3 shows a coupling housing surrounded by the ball-type coupling arrangement according to FIG. 1 and FIG. 2.
Figure 4:
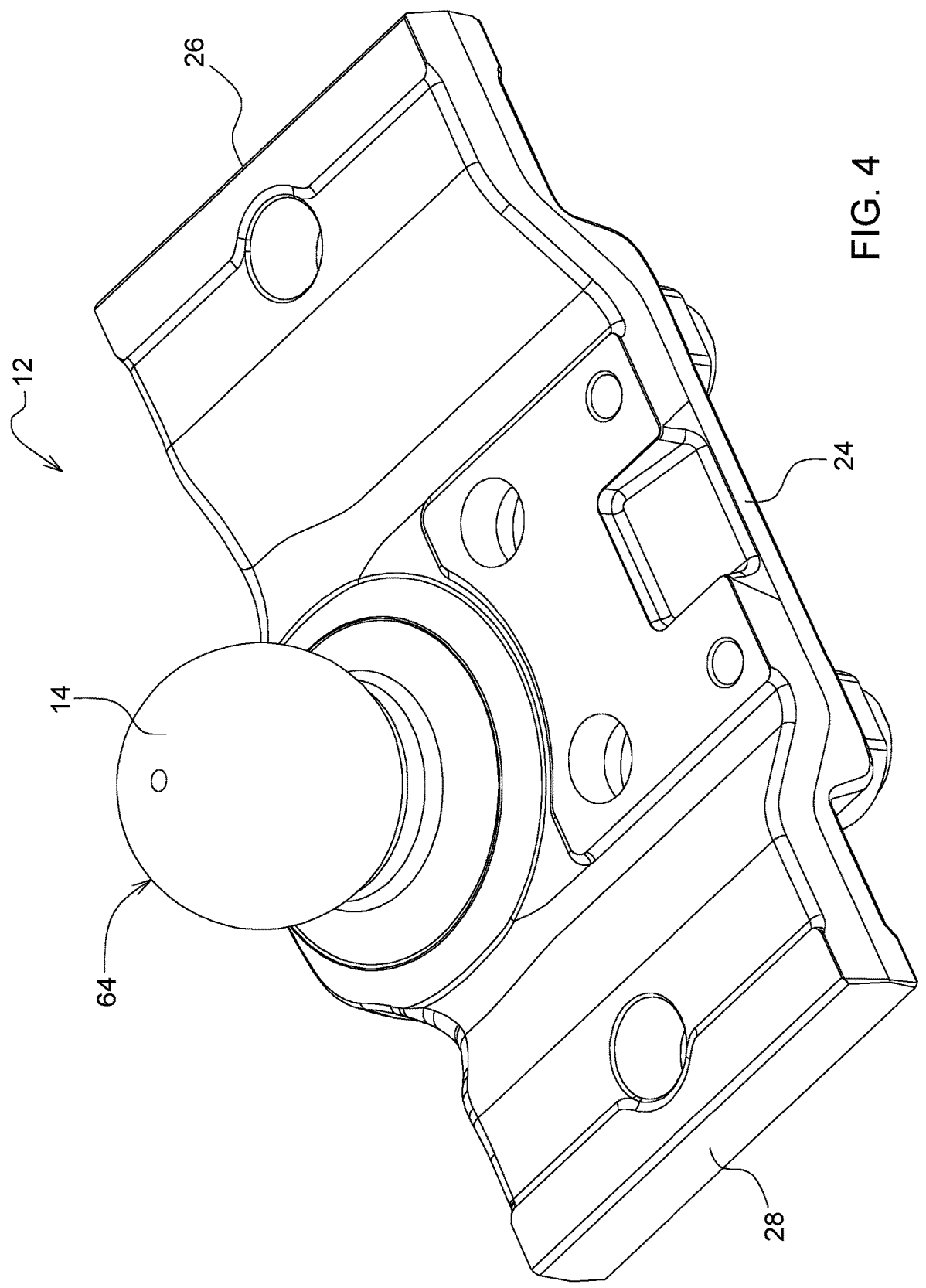
FIG. 4 shows a carrier plate, which is surrounded by a coupling base, for the mounting of the coupling housing from FIG. 3.

According to FIG. 3, the coupling housing 18 is designed as a separate component and is fastened releasably (indicated in FIGS. 1 and 2) to the coupling base 12 by means of a plurality of screws 22. The coupling base 12 comprises a carrier plate 24, shown in FIG. 4, on the upper side of which the coupling housing 18 is located in the mounted state. Left and right runners 26, 28 extend on the carrier plate 24 and can be pushed into guide rails, corresponding to them, of a universal coupling interface in the rear region of the agricultural tractor and locked therein (not shown). Both the coupling housing 18 and the carrier plate 24 are produced here as CNC-machined steel cast parts, with the coupling ball 14 being screwed to the carrier part 24 in order to permit wear-induced exchange.

It should be noted at this juncture that, in a departure from the above-described two-part design, the coupling housing 18 may basically also be an integral part of the coupling base 12 or of the carrier plate 24 surrounded by the latter.

Figure 5:
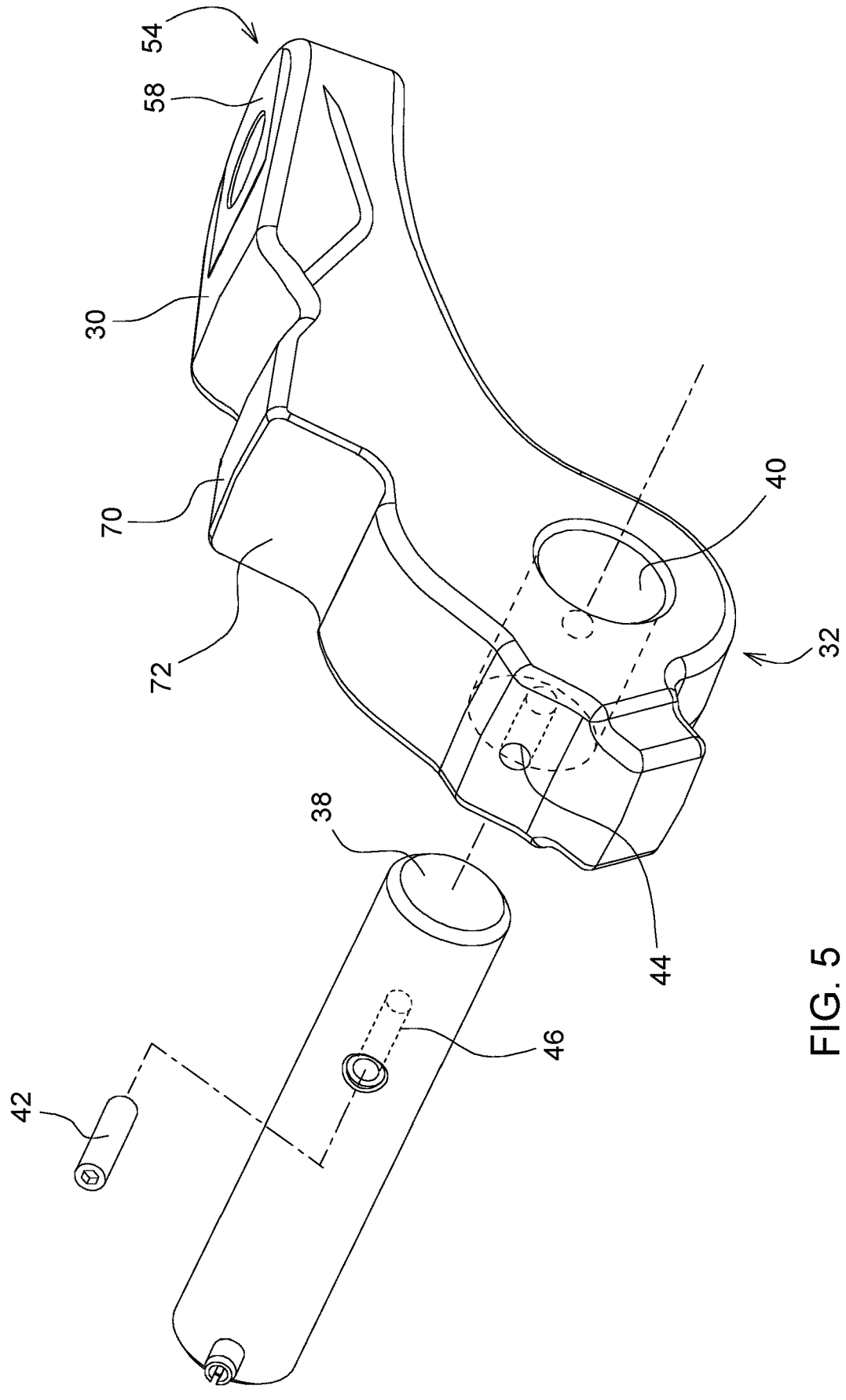
FIG. 5 shows a hold-down device surrounded by the ball-type coupling arrangement according to FIG. 1.

Furthermore, a hold-down device 30 which is in the form of an L-shaped steel forged part and is depicted in detail in FIG. 5 is provided. On the basis of the illustration in FIG. 2, the hold-down device 30 is mounted rotatably in the region of a first end 32 by means of an articulated shaft 38 between two opposite left and right cheeks 34, 36 on the coupling housing 18. The articulated shaft 38 extends through a receiving opening 40 provided in the first end 32 of the hold-down device 30, the receiving opening being mounted nonrotatably within the receiving opening 40 by means of a transverse pin 42. The transverse pin 42 runs here through a bore 44, which is provided laterally in the hold-down device 30, as far as a transverse bore 46, which is aligned with the bore 44, in the articulated shaft 38.

The hold-down device 30 is pretensioned by means of a spring element 48 in the direction of a position 50 releasing the coupling ball 14. The spring element 48 is a leg spring 52 which is supported at one end on the coupling housing 18 and at the other end on the articulated shaft 38 connected to the hold-down device 30 for rotation therewith. The spring pretensioning exerted on the articulated shaft 38 by means of the leg spring 52 is dimensioned in such a manner that, when the locking is released, the hold-down device 30 automatically takes up its position 50 releasing the coupling ball 14.

In the region of a second end 54, the hold-down device 30 has a thrust piece 56 which faces the coupling ball 14 and is in the form of a punch 60 screwed in a fastening eye 58 (see FIG. 5) of the hold-down device 30. By means of the punch 60, the movement clearance of the coupling socket 16 can be restricted, by bringing the hold-down device 30 into a locking position 62, to an extent such that an unintentional release of the coupling connection by the coupling socket 16 springing off the coupling ball 14 is prevented. That side of the punch 60 which faces the coupling ball 14 runs at a defined distance from the ball surface 64. The clearance formed in such a way is selected such that the ball socket 16 is capable of following, without hindrance, driving-induced pivoting movements of the drawbar 20.

In general terms, the hold-down device 30 is coupled to the coupling housing 18 in such a manner that it can be pivoted between a position 62 locking the coupling ball 14 (locked state according to FIG. 1) and a position 50 releasing the coupling ball (released state according to FIG. 2).

Figure 6:
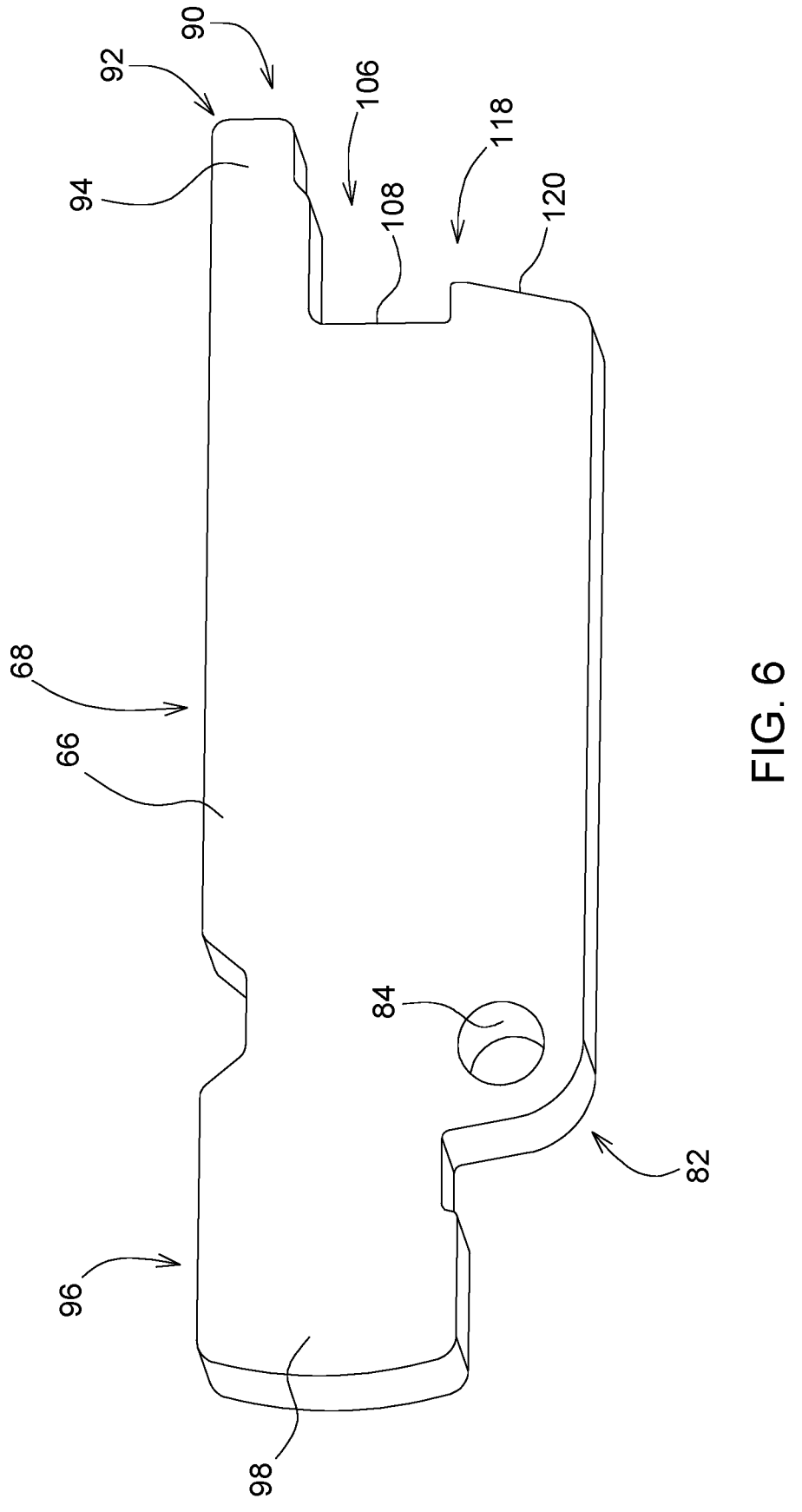
FIG. 6 shows a closure element, which is surrounded by the ball-type coupling arrangement according to FIG. 1, in the form of a transverse latch.

Furthermore, a closure element 68 in the form of a transverse latch 66 is attached to the coupling housing 18, which closure element, in order to lock the hold-down device 30 in its locking position 62 according to FIG. 1, can be brought into contact with a planar stop region 72 (see FIG. 5) formed on an outer contour 70 of the hold-down device 30. The planar stop region 72 is oriented radially with respect to the point of rotation, formed by the articulated shaft 38, of the hold-down device 30 on the coupling housing 18. In the locking position 74 formed in this way, the transverse latch 66 runs perpendicularly to the pivoting direction 76 of the hold-down device 30 on the coupling housing 18 and extends from the one to the other cheek 34, 36 of the coupling housing 18, with a pivoting movement of the hold-down device 30 in the direction of the position 50 releasing the coupling ball 14 being completely blocked by the transverse latch 66. The transverse latch 66, which is reproduced in detail in FIG. 6, is produced from flat material or sheet material of a suitable steel alloy, and therefore it forms a flat mating surface for contact of the planar stop region 72 provided on the hold-down device 30.

According to FIG. 2, the transverse latch 66 is coupled to the coupling housing 18 in such a manner that it can be pivoted or swung up manually from its locking position 74 in FIG. 1 into a position 78 releasing the locking of the hold-down device 30. A slot-shaped recess 80, which is located by way of example on the left cheek 34, receives a coupling region 82 (see FIG. 6) of the transverse latch 66 in a form-fitting manner, the coupling region 82 being mounted rotatably within the slot-shaped recess 80 by means of a hinge pin (not shown) extending through a bore 84. As can furthermore be seen in FIG. 2, the two cheeks 34, 36 are connected to each other on a side facing away from the transverse latch 66 via a bridge portion 86, wherein a guide surface 88 supporting the transverse latch 66 is additionally formed on the bridge portion 86.

The transverse latch 66 has a gripping region 92 at a free end 90 opposite the coupling region 82. The gripping region 92 is shaped in the form of a latch portion 94 projecting over the adjacent right cheek 36 of the coupling housing 18. In addition, an anvil-like protrusion 96 extending over the coupling region 82 in the opposite direction to the free end 90 and being in the form of a further latch portion 98 is provided on the transverse latch 66. By action by means of a hammer or another impact tool on the anvil-like protrusion 96, opening of the transverse latch 66 by it being pivoted out of its locking position 74 can be assisted.

Figure 7:
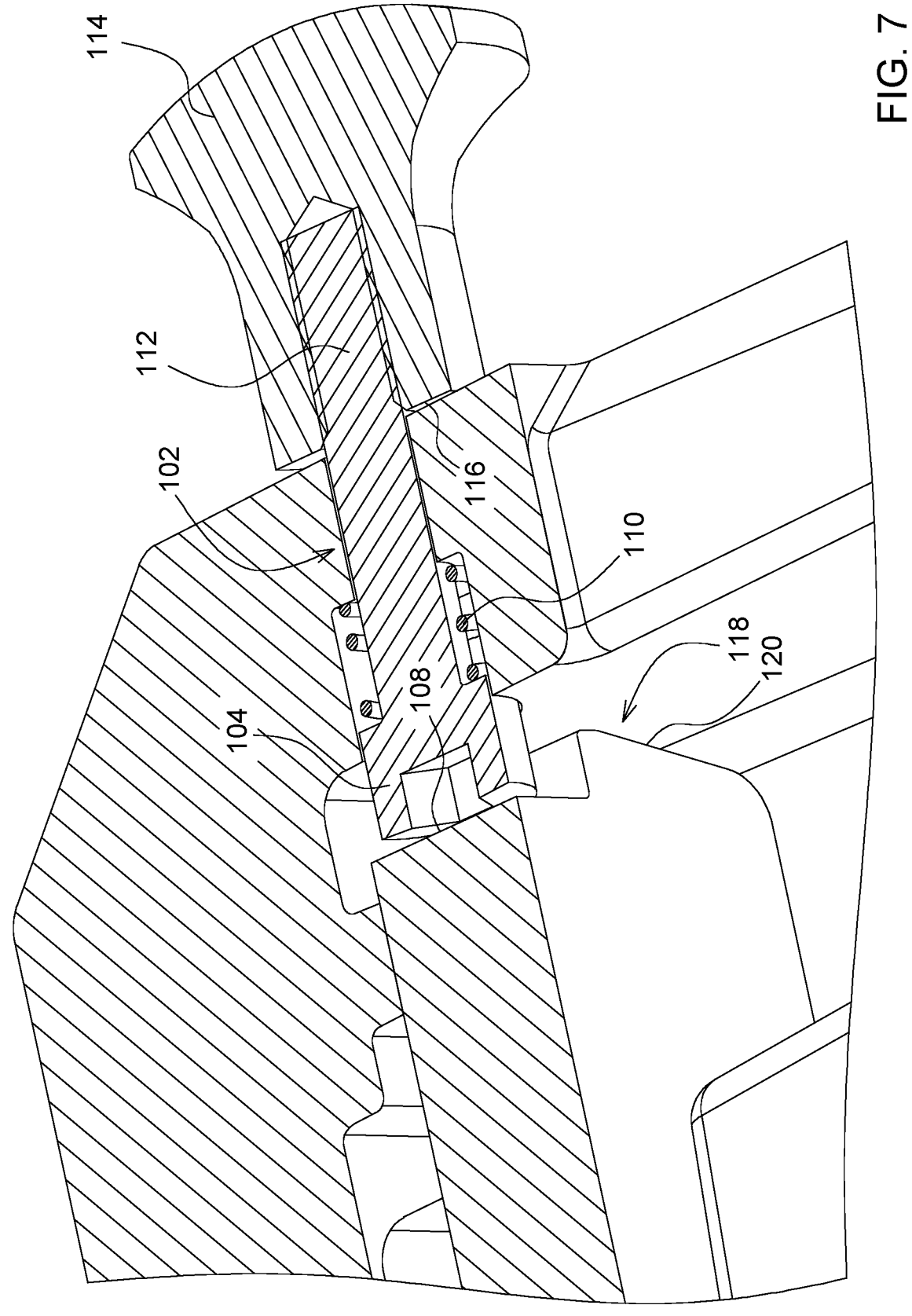
FIG. 7 shows a securing mechanism, which is reproduced in section, for securing the transverse latch in a locking position blocking a pivoting movement of the hold-down device on the coupling housing.

In order to prevent unintentional release of the coupling connection, the transverse latch 66 can be secured in its locking position 74 by means of a manually actuable securing mechanism 100. The securing mechanism 100, which is reproduced in section in FIG. 7, comprises a spring-pretensioned securing bolt 102, the free end 104 of which engages in a recess 106 formed in the transverse latch 66 in the locking position 74 thereof. The recess 106 extends on the end side in the region of the free end 90 of the pivotable transverse latch 66 and is in the form of an engagement slot 108 adapted to the outside diameter of the securing bolt 102. The securing bolt 102, together with a compression spring 110 provided for building up the spring pretensioning, is mounted in the right cheek 34 of the coupling housing 18 adjacent to the free end 90 of the transverse latch 66, wherein a fastening end 112 of the securing bolt 102 can extend through the cheek 36 concerned and, for its part, can support a knob 114 which at the same time forms a mating bearing 116 for limiting an extension movement of the spring-pretensioned securing bolt 102.

Figure 8:
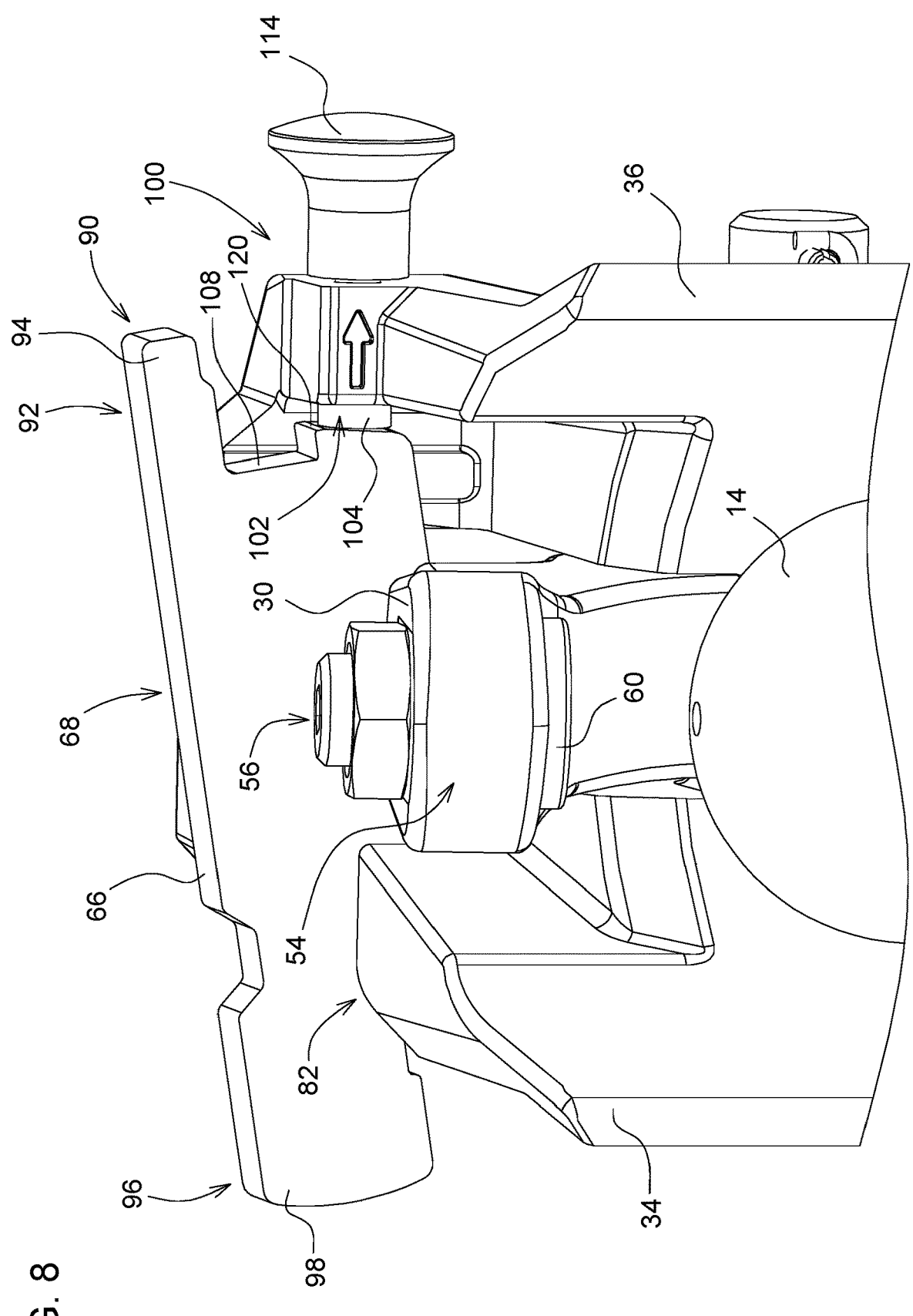
FIG. 8 shows a snap-action closure surrounded by the securing mechanism according to FIG. 7.

According to FIG. 8, the recess 106 on the transverse latch 66 is contoured along an entry region 118 in such a manner that a snap-action closure is formed in interaction with the free end 104 of the spring-pretensioned securing bolt 102. The entry region 118 has a ramp-shaped contour 120 which pushes the securing bolt 102 away counter to the spring pretensioning during the closing of the pivotable transverse latch 66 in the direction of its locking position 74, in order, when a final position, here the locking position 74, is reached, to latch into the engagement slot 108 adjoining it.

The engagement slot 108, which is provided on the transverse latch 66, the coupling region 82, the two latch portions 94, 98 and the ramp-shaped contour 120 are produced in one working step by laser cutting when flat material or sheet material of a suitable steel alloy is used.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A ball-type coupling arrangement for an agricultural tractor, comprising:
a coupling base with a coupling ball attached thereto for receiving a coupling socket;
a coupling housing arranged on the coupling base;
a hold-down device including a planar stop region formed on an outer contour, the hold-down device coupled to the coupling housing such that it is pivotable between a position locking the coupling ball and a position releasing the coupling ball; and
a closure element attached to the coupling housing, the closure element contacting the planar stop region in a locking position to lock the hold-down device in its locking position;
wherein the closure element is formed as a transverse latch extending in a locking position perpendicular to the pivoting direction of the hold-down device on the coupling housing, the transverse latch can be secured in the locking position via a manually actuable securing mechanism, which includes a spring-pretensioned securing bolt having a free end engaging in a recess formed in the transverse latch in the locking position.

2. The ball-type coupling arrangement of claim 1, wherein the transverse latch is coupled to the coupling housing such that it can be pivoted manually into a position releasing the locking of the hold-down device.

3. The ball-type coupling arrangement of claim 1, wherein the planar stop region is oriented radially with respect to a point of rotation serving for coupling the hold-down device to the coupling housing.

4. The ball-type coupling arrangement according of claim 1, wherein the transverse latch has a coupling region for the rotatable mounting on the coupling housing, and the transverse latch has a gripping region at a free end opposite the coupling region.

5. The ball-type coupling arrangement of claim 4, wherein a protrusion extending over the coupling region in the opposite direction to the free end is provided on the transverse latch.

6. The ball-type coupling arrangement of claim 1, wherein the recess is contoured along an entry region in such a manner that a snap-action closure is formed in interaction with the free end of the spring-pretensioned securing bolt.

7. The ball-type coupling arrangement of claim 1, wherein the hold-down device is pretensioned via a spring element in the direction of the position releasing the coupling ball.

8. An agricultural tractor including a ball-type coupling arrangement, comprising:
a coupling base with a coupling ball attached thereto for receiving a coupling socket;
a coupling housing arranged on the coupling base;
a hold-down device including a planar stop region formed on an outer contour, the hold-down device coupled to the coupling housing such that it is pivotable between a position locking the coupling ball and a position releasing the coupling ball; and
a closure element attached to the coupling housing, the closure element contacting the planar stop region in a locking position to lock the hold-down device in its locking position, the closure element is formed as a transverse latch extending in a locking position perpendicular to the pivoting direction of the hold-down device on the coupling housing, and the transverse latch being secured in the locking position via a manually actuable securing mechanism, which includes a spring-pretensioned securing bolt having a free end engaging in a recess formed in the transverse latch in the locking position.

9. The agricultural tractor of claim 8, wherein the transverse latch is coupled to the coupling housing such that it can be pivoted manually into a position releasing the locking of the hold-down device.

10. The agricultural tractor of claim 8, wherein the planar stop region is oriented radially with respect to a point of rotation serving for coupling the hold-down device to the coupling housing.

11. The agricultural tractor according of claim 8, wherein the transverse latch has a coupling region for the rotatable mounting on the coupling housing, and the transverse latch has a gripping region at a free end opposite the coupling region.

12. The agricultural tractor of claim 11, wherein a protrusion extending over the coupling region in the opposite direction to the free end is provided on the transverse latch.

13. The agricultural tractor of claim 8, wherein the recess is contoured along an entry region in such a manner that a snap-action closure is formed in interaction with the free end of the spring-pretensioned securing bolt.

14. The agricultural tractor of claim 8, wherein the hold-down device is pretensioned via a spring element in the direction of the position releasing the coupling ball.

\*  \*  \*  \*  \*